United States Patent
Kim et al.

(10) Patent No.: US 7,408,894 B2
(45) Date of Patent: Aug. 5, 2008

(54) APPARATUS AND METHOD FOR CONTROLLING POWER OF REVERSE CHANNELS IN A MOBILE COMMUNICATION SYSTEM

(75) Inventors: Youn-Sun Kim, Seoul (KR); Dae-Gyun Kim, Songnam-shi (KR); Ho-Kyu Choi, Songnam-shi (KR); Hwan-Joon Kwon, Seoul (KR); Hoon Huh, Songnam-shi (KR); Yu-Suk Yun, Seoul (KR); Dong-Hee Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1180 days.

(21) Appl. No.: 10/283,545

(22) Filed: Oct. 30, 2002

(65) Prior Publication Data

US 2003/0081572 A1    May 1, 2003

(30) Foreign Application Priority Data

Oct. 30, 2001 (KR) .................. 10-2001-0067274

(51) Int. Cl.
*H04B 7/185* (2006.01)
(52) U.S. Cl. .................. 370/318; 455/13.4; 455/522
(58) Field of Classification Search .................. 370/332, 370/342, 318; 455/63, 13.4, 522
See application file for complete search history.

(56) References Cited

U.S. PATENT DOCUMENTS

| | | | | |
|---|---|---|---|---|
| 5,528,593 A | * | 6/1996 | English et al. .............. 370/391 |
| 5,745,520 A | * | 4/1998 | Love et al. .................. 375/130 |
| 6,396,867 B1 | * | 5/2002 | Tiedemann et al. ......... 375/141 |
| 6,560,744 B1 | * | 5/2003 | Burshtein .................... 714/774 |
| 6,587,696 B1 | * | 7/2003 | Ma et al. ..................... 455/522 |
| 7,085,239 B2 | * | 8/2006 | Ling et al. .................. 370/252 |
| 2006/0002348 A1 | * | 1/2006 | Chaponniere et al. ....... 370/335 |
| 2007/0076713 A1 | * | 4/2007 | Odenwalder et al. ........ 370/389 |

FOREIGN PATENT DOCUMENTS

| | | |
|---|---|---|
| JP | 08-307964 | 11/1996 |
| JP | 11-313028 | 11/1999 |
| JP | 2001-256583 | 9/2001 |
| JP | 2001-285193 | 10/2001 |
| WO | WO 00/54430 | 9/2000 |

* cited by examiner

*Primary Examiner*—Wing F. Chan
*Assistant Examiner*—Anthony Sol
(74) *Attorney, Agent, or Firm*—The Farrell Law Firm, PC

(57) ABSTRACT

Disclosed is an apparatus for performing power control on a reverse channel quality indicator channel (CQICH) received from a mobile station by a base station in a mobile communication system including the base station for transmitting a power control bit for power control on reverse channels and the mobile station for controlling transmission power of the reverse channels according to the power control bit. An erasure detector determines whether to perform an erasure process by measuring reception power of the reverse channel quality indicator channel. An erasure rate calculator accumulates the erasure-determined result for N slots and calculates an erasure rate for the N slots. A control bit generator determines a ratio control bit to be transmitted to the mobile station according to the erasure rate, to issue a command to increase or decrease a CQICH traffic-to-pilot ratio.

28 Claims, 9 Drawing Sheets

APPARATUS AND METHOD FOR CONTROLLING POWER OF REVERSE CHANNELS IN A MOBILE COMMUNICATION SYSTEM

PRIORITY

This application claims priority to an application entitled "Apparatus and Method for Controlling Power of Reverse Channels in a Mobile Communication System" filed in the Korean Industrial Property Office on Oct. 30, 2001 and assigned Serial No. 2001-67274, the contents of which are hereby incorporated herein by reference.

BACKGROUND OF THE INVENTION

1. Field of the Invention

The present invention relates generally to a mobile communication system, and in particular, to an apparatus and method for controlling transmission power of a reverse channel quality indicator channel.

2. Description of the Related Art

An IS-2000 CDMA (Code Division Multiple Access) mobile communication system, a typical mobile communication system, supports only a voice service. However, with the development of the communication technology and at the request of users, research has been carried out on a mobile communication system for supporting a data service. For example, an HDR (High Data Rate) communication system has been proposed to support only a high-speed data service.

The existing mobile communication systems are classified into one mobile communication system for supporting only the voice service and another mobile communication system for supporting only the data service. That is, although the mobile communication system is required to support both the voice service and the data service, the conventional mobile communication system is designed to support only one of the voice service and the data service. Therefore, there have been long demands for a mobile communication system capable of supporting both the voice service and the data service. To meet the demands, a 1×EV-DV (Evolution in Data and Voice) mobile communication system has been recently proposed.

A mobile communication system divides its whole service area into a plurality of cells, and manages the divided cells with their associated base stations (BSs). The base stations are centrally managed by a mobile switching center (MSC) so that a mobile station (MS) can continue a call while on the move between the cells. The base stations communicate with the mobile station over radio channels.

Unlike a land (or wired) communication system, the mobile communication system may have many transmission errors under the influence of fading and interference. A typical method for preventing the transmission errors is to increase transmission power high enough to cover the fading and interference. However, the increase in transmission power may interfere with radio channels of adjacent users. That is, in a mobile communication system, power control on a radio channel exerts a great influence on system performance. Commonly, a base station and a mobile station perform mutual power control. A procedure for controlling transmission power of a channel transmitted from the base station to the mobile station is called "forward power control," while a procedure for controlling transmission power of a channel transmitted from the mobile station to the base station is called "reverse power control."

In addition, a CDMA system can simultaneously connect a plurality of encoded channels through one frequency channel in the same time slot. By using this characteristic, a mobile station located in an overlapping region (or soft handoff region) between two adjacent base stations can simultaneously connect separate channels to the base stations in order to continue a call. This is called "soft handoff." In this case, power control must be performed on all the base stations in communication with the mobile station.

FIG. 1 illustrates a method for performing reverse power control on a mobile station in a soft-handoff state in a conventional mobile communication system. Here, a mobile station 103 in a soft-handoff state communicates with two neighboring base stations (or sectors) 101 and 102.

A reverse power control procedure will be described with reference to FIG. 1. A sector #1 101 and a sector #2 102 each measure a reverse pilot channel (R-PICH) from the mobile 103 to estimate a signal-to-interference ratio Ep/Nt (i.e., a ratio of signal power of a pilot channel to interference power), and compare the Ep/Nt with a reference value (or outer loop set point) set for outer loop power control. If the estimated signal-to-interference ratio is larger than or equal to the reference value, the sectors 101 and 102 transmit power-down commands for a reverse channel to the mobile station 103 over a forward common power control channel (F-CPCCH). Otherwise, if the estimated signal-to-noise ratio is lower than the reference value, the base stations 101 and 102 send power-up commands for a reverse channel to the mobile station 103 over the forward common power control channel. The power control commands are transmitted by transmitting power control bits (PCBs) over a common power control channel (CPCCH) in the forward direction (i.e., F-CPCCH).

The mobile station 103 receives PCB1 and PCB2 over CPCCH1 and CPCCH2 from the sector #1 101 and the sector #2 102, respectively. If any one of the PCB1 and the PCB2 is a power-down command, the mobile station 103 decreases transmission power of a reverse channel, and if both of the PCB1 and the PCB2 are a power-up command, the mobile station 103 increases transmission power of the reverse channel.

Next, a forward power control procedure will be described. Transmission power of a forward channel is determined using channel quality information received over a reverse channel quality indicator channel (CQICH). The channel quality indicator channel is used by the mobile station to measure a received signal strength indicator (e.g., carrier-to-interference ratio (C/I)) of forward common pilot channel transmitted from a specific sector, and transmit the C/I value to the sector.

In general, the mobile station measures C/I values of common pilot channels transmitted from neighboring sectors, and transmits quality information (e.g., the measured C/I value) of a sector (hereinafter, called a "best sector") having the highest C/I value among the measured C/I values to the best sector (sector #1 101 in the case of FIG. 1) over the channel quality indicator channel. The best sector then transmits forward packet data to the mobile station.

Conventionally, transmission power of a channel quality indicator channel is set to maintain a specified ratio of a reverse pilot channel and a reverse traffic channel. That is, when transmission power of the reverse pilot channel and the reverse traffic channel is decreased, transmission power of the channel quality indicator channel is also decreased in a specific ratio. In contrast, if transmission power of the reverse pilot channel and the reverse traffic channel is increased, transmission power of the channel quality indicator channel is also increased in a specific ratio.

However, unlike the reverse pilot channel or traffic channel, the channel quality indicator channel is not a target of the soft handoff. That is, the channel quality indicator channel is received at only a specific sector having the best forward channel quality among the sectors neighboring to the mobile station. In contrast, since the reverse pilot channel and traffic channel are transmitted to two or more sectors in a soft handoff state, they can guarantee good reception performance. In addition, reception performance of the traffic channel can be improved through selection diversity or combining.

When power control on the channel quality indicator channel is performed in the same way as power control on the reverse pilot channel and traffic channel, reception performance of the reverse pilot channel and traffic channel satisfies a desired level, but there is a high possibility that reception performance of the channel quality indicator channel will be lower than the desired level. This will be explained further below with reference to FIG. 2.

In addition, in the case of the channel quality indicator channel, a sector measures reception power of the channel quality indicator channel, and performs an erasure process on the channel quality indicator channel if the measured reception power is not high enough to guarantee stable transmission. When the channel quality indicator channel is erased, a received signal on the channel quality indicator channel is not decoded. The sector then cannot acquire forward channel quality information, so the sector cannot normally perform forward power control. In addition, in a mobile communication system performing forward packet data transmission by consulting forward channel quality information like the 1×EV-DV system, frequent occurrence of the erasure process on the channel quality indicator channel causes a decrease in forward capacity. Therefore, there have been demands for power control on the reverse channel in order to improve performance of the channel quality indictor channel.

SUMMARY OF THE INVENTION

It is, therefore, an object of the present invention to provide an apparatus and method for controlling transmission power of a reverse channel quality indicator channel (CQICH) transmitting channel quality information of a forward channel in a mobile communication system.

It is another object of the present invention to provide an apparatus and method for controlling a CQICH traffic-to-pilot ratio in a mobile communication system.

It is further another object of the present invention to provide an apparatus and method for controlling a CQICH traffic-to-pilot ratio according to an erasure rate of a reverse channel quality indictor channel in a mobile communication system.

To achieve the above and other objects, the present invention provides an apparatus for performing power control on a reverse channel quality indicator channel (CQICH) received from a mobile station by a base station in a mobile communication system including the base station for transmitting a power control bit for power control on reverse channels and the mobile station for controlling transmission power of the reverse channels according to the power control bit. The apparatus comprises an erasure detector for determining whether to perform an erasure process by measuring reception power of the reverse channel quality indicator channel every time slot. An erasure rate calculator accumulates the erasure-determined result for N slots and calculates an erasure rate for the N slots. A control bit generator determines a ratio control bit to be transmitted to the mobile station according to the erasure rate, to issue a command to increase or decrease a CQICH traffic-to-pilot ratio.

In addition, the present invention provides a method for performing power control on a reverse channel quality indicator channel by a base station receiving a reverse pilot channel, a reverse traffic channel and the reverse channel quality indictor channel from a mobile station. The method comprises generating a power control bit indicating a command to increase or decrease transmission power of the reverse channels by measuring reception power of the reverse pilot channel. Whether to perform an erasure process is determined by measuring reception power of the reverse channel quality indicator channel, and calculating an erasure rate for N slots according to the erasure determination result. A ratio control bit indicating a command to increase or decrease a CQICH traffic-to-pilot ratio is determined according to the erasure rate. The ratio control bit is transmitted at one or more selected time slots among a plurality of time slots on a forward channel, and the power control bits are transmitted at the other time slots except the selected one or more time slots.

In addition, the present invention provides an apparatus for performing power control on reverse channels by a mobile station transmitting a reverse pilot channel, a reverse traffic channel and a reverse channel quality indicator channel (CQICH) to a base station. The apparatus comprises a control bit detector for receiving a control bit from the base station every time slot, and determining whether the received control bit is a ratio control bit indicating a command to increase or decrease a CQICH traffic-to-pilot ratio or a power control bit indicating a command to increase or decrease transmission power of the reverse channels. A ratio controller controls, if the control bit is a ratio control bit, a CQICH traffic-to-pilot ratio according to the ratio control bit a gain controller receives, if the control bit is a ratio control bit, the ratio provided from the ratio controller, and controls, if the control bit is a power control bit, transmission gains of the reverse pilot channel, the reverse traffic channel and the reverse channel quality indicator channel according to the power control bit and the provided ratio.

In addition, the present invention provides a method for performing power control on reverse channels by a mobile station transmitting a reverse pilot channel, a reverse traffic channel and a reverse channel quality indicator channel to a base station. The method comprises receiving a ratio control bit indicating a command to increase or decrease a CQICH traffic-to-pilot ratio at one or more selected time slots among a plurality of time slots on a forward channel. A CQICH traffic-to-pilot ratio is controlled according to the ratio control bit. Power control bits are received indicating a command to increase or decrease transmission power of the reverse pilot channels at the other time slots except the selected one or more time slots. Transmission gains of the reverse pilot channel, the reverse traffic channel and the reverse channel quality indicator channel are controlled according to the power control bit and the ratio controlled at a previous time slot.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, a channel quality indicator channel (CQICH) is used by a mobile station to transmit forward channel quality, i.e., signal strength (e.g., signal-to-interference ratio or C/I), obtained by measuring forward common pilot channels transmitted from neighboring base stations (or sectors). The channel quality indicator channel further includes a sector indicator indicating a best sector, a sector having the greatest forward channel quality. The sector indicator is used by the mobile station to select a sector from which it desires to receive packet data over a forward traffic channel. Upon receiving forward channel quality information and a sector indicator over the channel quality indicator channel, a corresponding sector determines transmission point, modulation technique, and coding rate of forward packet data based on the received information. Further, the sector schedules packet transmission based on the forward channel quality information.

Figure 1:
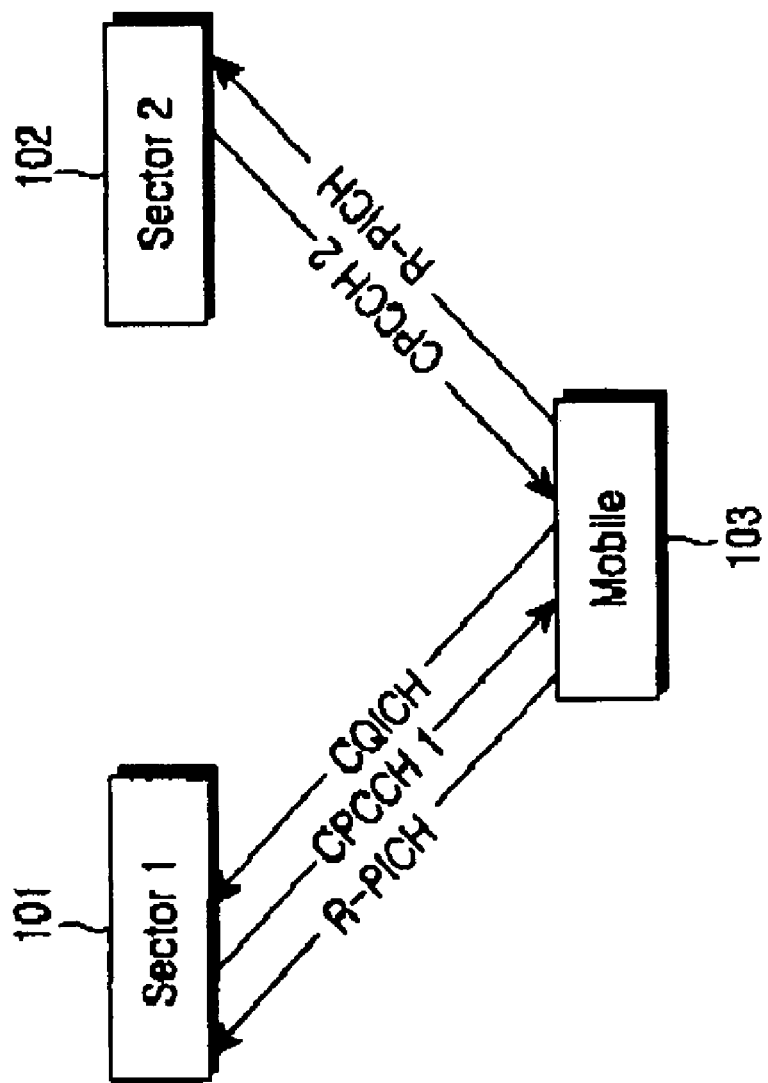
FIG. 1 illustrates reverse power control-related channels in a conventional mobile communication system.
Figure 2:
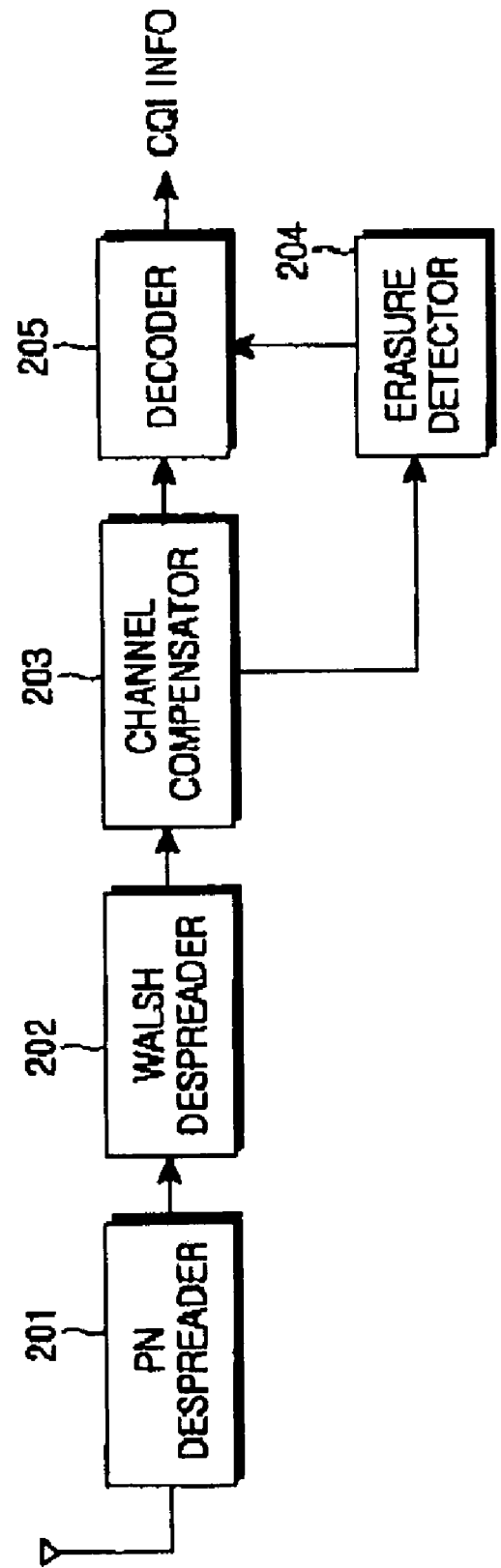
FIG. 2 illustrates a structure of a receiver for a channel quality indicator channel in a conventional mobile communication system.

FIG. 2 illustrates a structure of a receiver for a channel quality indicator channel in a conventional mobile communication system. Referring to FIG. 2, a PN (Pseudo-random Noise) despreader 201 despreads a signal received over a radio channel with a PN code assigned to the receiver. A Walsh despreader 202 despreads the PN despread signal from the PN despreader 201 with a Walsh code assigned to the channel quality indicator channel. A channel compensator 203 compensates for a transmission power difference between a pilot channel and the channel quality indicator channel by multiplying the Walsh despread signal from the Walsh despreader 202 by a conjugate signal of a channel estimation signal obtained from the pilot channel.

An erasure detector 204 measures reception power of the channel-compensated signal from the channel compensator 203, compares the measured reception power with predetermined reference power, and determines whether to perform an erasure process based on the determination result. An erasure process is performed to determine whether the channel quality indicator channel has energy high enough to obtain specified reception power. If the measured reception power is lower than the reference power, the erasure detector 204 disables a decoder 205. Otherwise, the erasure detector 204 enables the decoder 205. The decoder 205 then decodes the channel-compensated signal and restores (decodes) the forward channel quality information. The restored channel quality information is used for scheduling on forward packet transmission.

As stated above, when power control on the channel quality indicator channel is performed in the same way as power control on the reverse pilot channel or traffic channel, reception power of a channel quality indicator channel received from a mobile station in a soft-handoff state will be lower than reception power of a channel quality indicator channel received from a mobile station not in the soft-handoff state. This is because the channel quality indicator channel is transmitted to only one sector, so power control on this channel is performed in the same way as power control on other reverse channels but in only one sector. By contrast, power control on other reverse channels can be transmitted to several sectors.

To solve the problem, the present invention monitors an erasure rate of the channel quality indicator channel and controls a ratio of transmission power of the pilot channel to transmission power of the channel quality indicator channel based on the monitoring result. To this end, the base station transmits a CQICH traffic-to-pilot ratio control command. In response to the CQICH traffic-to-pilot ratio control command, the mobile station controls a power ratio of the reverse pilot channel to the channel quality indicator channel.

A CQICH traffic-to-pilot ratio control bit (hereinafter, referred to as "ratio control bit (RCB)") is distinguishable from a power control bit (PCB) that is transmitted over a forward channel for power control on the whole reverse channel, and the RCB is transmitted by puncturing the power control bit. Although the power control bit PCB and the ratio control bit RCB can be transmitted over a forward common power control channel (F-CPCCH) or another forward channel, it will be assumed herein that the control bits are transmitted over the forward common power control channel.

Figure 3:
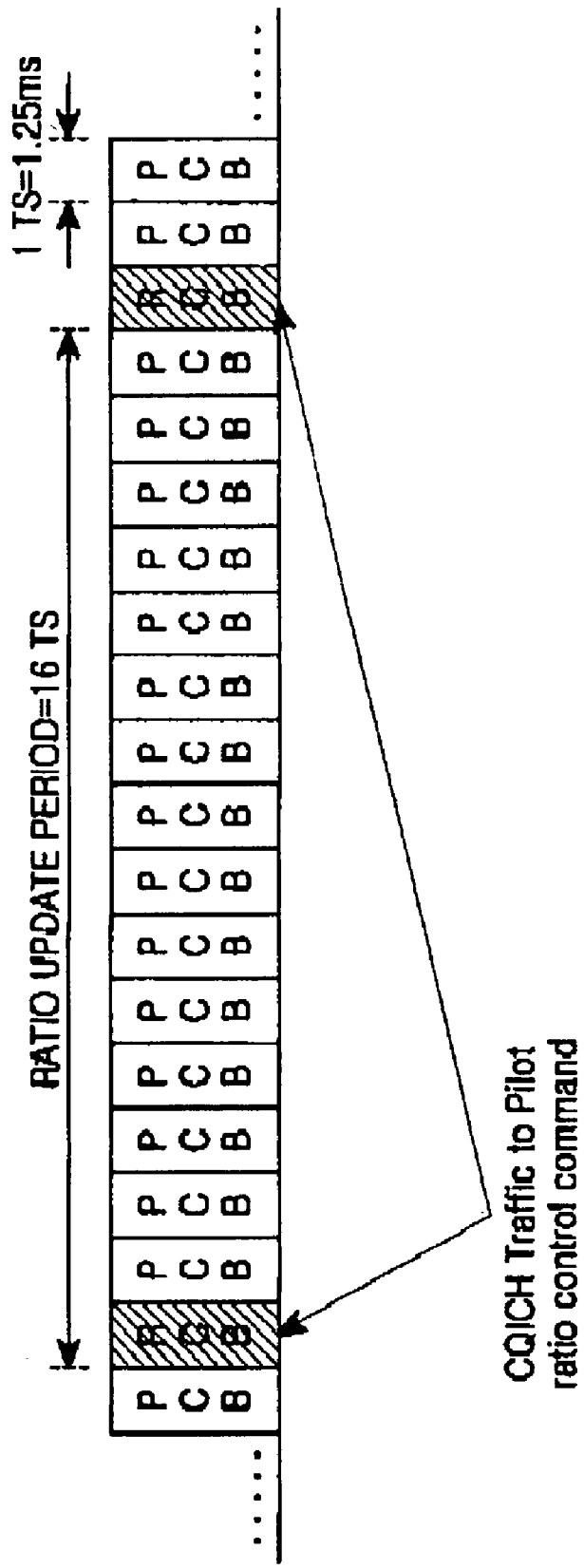
FIG. 3 illustrates an exemplary method of transmitting a power control bit (PCB) for reverse power control and a ratio control bit (RCB) for controlling a CQICH traffic-to-pilot ratio in a mobile communication system according to an embodiment of the present invention.

FIG. 3 illustrates an exemplary method of transmitting a power control bit (PCB) for reverse power control and a ratio control bit (RCB) for controlling a CQICH traffic-to-pilot ratio in a mobile communication system according to an embodiment of the present invention.

Referring to FIG. 3, in a forward common power control channel (F-CPCCH), a ratio control bit RCB is transmitted over one slot having a length of 1.25 ms, and its transmission period has 16 slots. That is, a base station transmits a ratio control bit RCB for controlling a power ratio of a channel quality indicator channel to a reverse pilot channel instead of a power control bit PCB for reverse power control every 16 slots. Upon receiving the ratio control bit RCB, a mobile station increases or decreases a CQICH traffic-to-pilot ratio by a predetermined level based on the received ratio control bit RCB. Information on the increase or decrease level is transmitted from the base station to the mobile station by signaling when communication between the base station and the mobile station begins, or is previously set to a specific value.

For example, if the power control bit indicates "power-up (+)," the mobile station increases the CQICH traffic-to-pilot ratio by 1dB. In contrast, if the power control bit indicates "power-down (−)," the mobile station decreases the CQICH traffic-to-pilot ratio by 1 dB.

In addition, a slot transmission period for transmitting the ratio control bit RCB by the base station and a position of the ratio control bit RCB in the transmission period are commonly known to the base station and the mobile station. The transmission period and the position are notified to the mobile station by the base station using a signaling message. Alternatively, the transmission period and the position are determined in an optimization process during installation of the mobile communication system, and then previously set in the mobile station and the base station. As another example, the transmission period and the position in the period are determined using a parameter commonly known to the base station and the mobile station, such as a long code mask of the mobile station.

Figure 4:
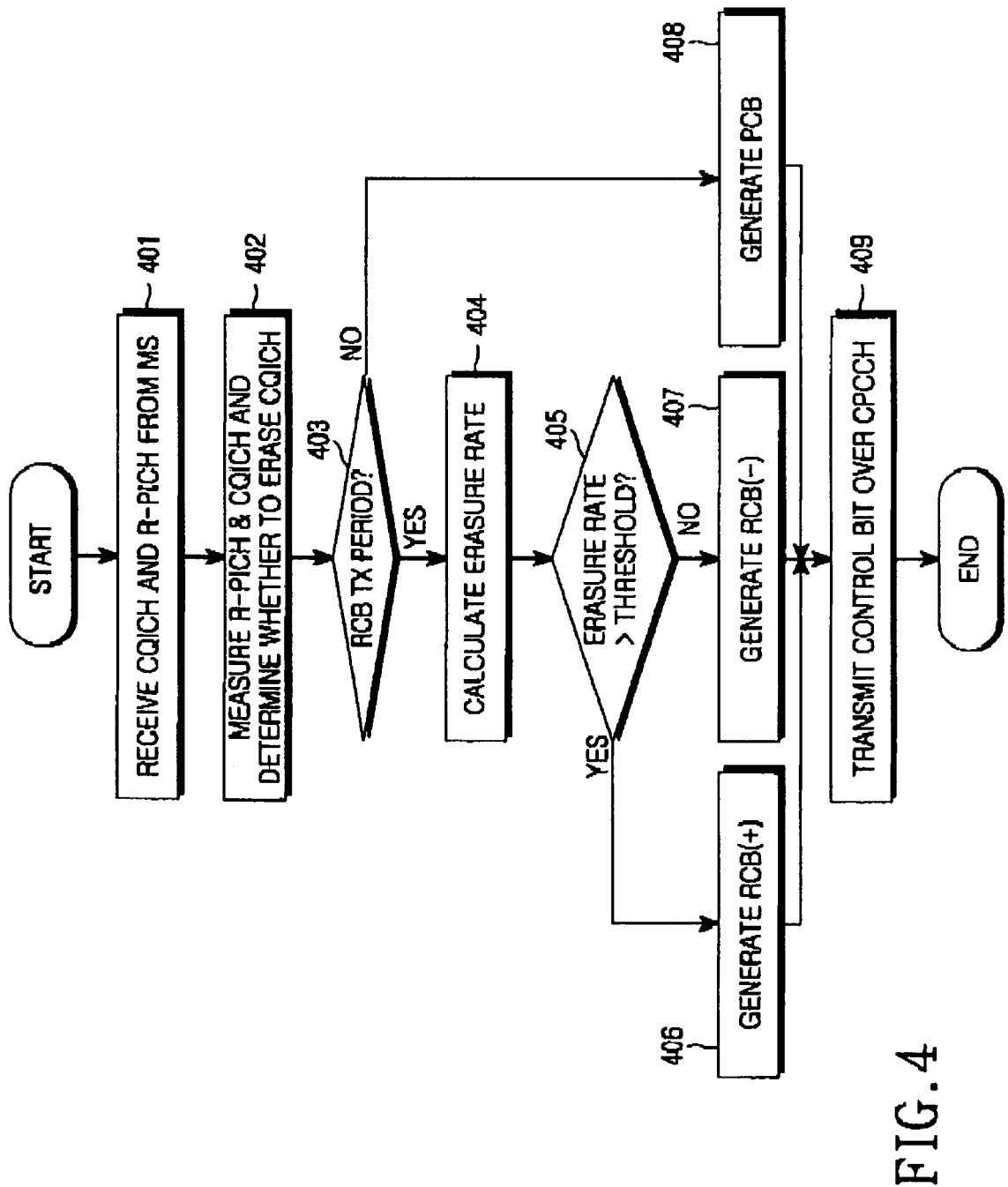
FIG. 4 illustrates a procedure for transmitting a power control bit PCB and a ratio control bit RCB by a base station in a mobile communication system according to an embodiment of the present invention.

FIG. 4 illustrates a procedure for transmitting a power control bit PCB and a ratio control bit RCB by a base station in a mobile communication system according to an embodiment of the present invention. The following operation will be performed by a base station every slot of a reverse channel.

Referring to FIG. 4, in step 401, a base station receives a channel quality indicator channel (CQICH) signal and a reverse pilot channel (R-PICH) signal, transmitted by a mobile station. In step 402, the base station measures reception power of the reverse pilot channel and the channel quality indicator channel, and determines whether to perform an erasure process on the channel quality indicator channel based on the measured reception power of the channel quality indicator channel.

Specifically, in step 402, the base station determines to perform the erasure process, if the measured reception power of the channel quality indicator channel is lower than a predetermined reference power. The determined result is accumulated for a given time window. If a size of the window is defined as N slots, an erasure-determined result (e.g., the number of erasures) of the channel quality indicator channel for the last N slots is accumulated. That is, if the measured reception power of the most recently received channel quality indicator channel is lower than the reference power, the base station increases the number of erasures for the last N slots, by 1.

Thereafter, the base station determines in step 403 whether a current slot is a period where the ratio control bit RCB is to be transmitted. As described before, the base station previously recognizes a slot where the ratio control bit RCB is to be transmitted, i.e., an RCB transmission period and a slot position in the transmission period, where the ratio control bit is to be transmitted. If it is determined in step 403 that the current slot is a time period where a ratio control bit is to be transmitted, the base station calculates, in step 404, a CQICH erasure rate of the mobile station for the current slot. The CQICH erasure rate is calculated by CQICH Erasure Rate=(Number of CQICH erasures for last N slots)÷N      Equation (1)

In Equation (1), N represents the size of a window for calculating a CQICH erasure rate as described above.

In step 405, the base station determines whether to increase or decrease a CQICH traffic-to-pilot ratio based on the CQICH erasure rate. If the CQICH erasure rate is greater than a predetermined reference erasure rate, the base station generates, in step 406, a ratio control bit RCB(+) indicating a command to increase the CQICH traffic-to-pilot ratio. However, if the CQICH erasure rate is less than or equal to the reference erasure rate, the base station generates, in step 407, a ratio control bit RCB(−) indicating a command to decrease the CQICH traffic-to-pilot ratio.

Meanwhile, if it is determined in step 403 that the current slot is not a period where the ratio control bit RCB is to be transmitted, the base station generates, in step 408, a power control bit PCB for power control of reverse channels. Specifically, if the reception power of a pilot channel measured in step 402 is lower than the predetermined reference power, the base station generates a power control bit PCB(+) indicating a command to increase transmission power of a reverse channel. However, if the measured reception power is higher than the reference power, the base station generates a power control bit PCB(−) indicating a command to decrease transmission power of the reverse channel.

In step 409, the base station transmits the control bit generated in steps 406, 407, or 408 over the forward common power control channel (F-CPCCH).

Figure 5:
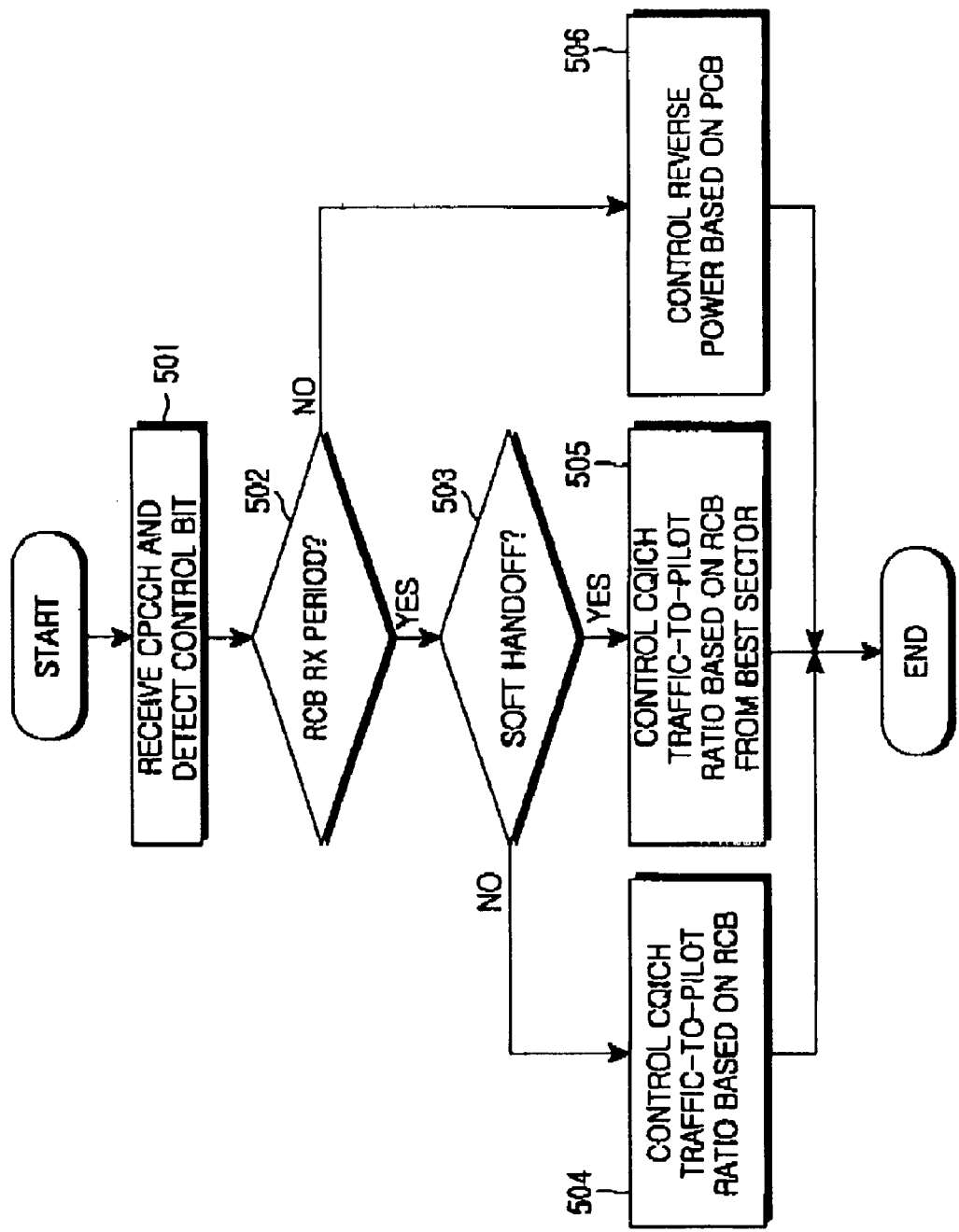
FIG. 5 illustrates a procedure for receiving a ratio control bit RCB and controlling transmission power of a channel quality indicator channel by a mobile station in a soft-handoff state in a mobile communication system according to an embodiment of the present invention.

FIG. 5 illustrates a procedure for receiving a ratio control bit RCB by a mobile station in a mobile communication system according to an embodiment of the present invention. The following operation will be performed by a mobile station every slot of a forward channel.

Referring to FIG. 5, in step 501 a mobile station receives a signal on a forward common power control channel transmitted by a base station, and detects a control bit from the received signal. The common power control channel transmits not only power control bit PCB but also a ratio control bit RCB for controlling a CQICH traffic-to-pilot ratio according to an embodiment of the present invention. Therefore, the mobile station determines in step 502 whether a current slot belongs to an RCB reception period, in order to determine whether the detected control bit is a power control bit or a ratio control bit. As stated above, the mobile station previously recognizes a slot where the base station transmits a ratio control bit, i.e., recognizes a transmission period of a ratio control bit and a slot position in the transmission period where the ratio control bit is transmitted.

If it is determined in step 502 that the current slot belongs to the RCB reception period, the mobile station judges that the detected control bit is a ratio control bit, and performs steps 503 to 505 to control a CQICH traffic-to-pilot ratio.

More specifically, the mobile station determines in step 503 whether the number of sectors included in an active set is larger than 1, in order to check whether the mobile station communicates with one or more base stations in a soft handoff region. As is well known, the active set means a list of sectors in communication with the mobile station. If the number of sectors in the active set is larger than 1, it means that the mobile station is performing a soft handoff.

As a result of the determination, if the number of sectors included in the active set is not larger than 1 (i.e., no soft handoff), the mobile station controls, in step 504, a CQICH traffic-to-pilot ratio according to the ratio control bit. That is, if the ratio control bit is an increase RCB(+), the mobile station increases the CQICH traffic-to-pilot ratio. However, if the ratio control bit is a decrease RCB(−), the mobile station decreases the CQICH traffic-to-pilot ratio.

If the number of sectors included in the active set is larger than 1 in step 503 (i.e., soft handoff), the mobile station analyzes, in step 505, ratio control bits received from the respective 2 or more sectors in the active set. Therefore, the mobile station controls a CQICH traffic-to-pilot ratio according to a ratio control bit from a best sector among the sectors included in the active set. That is, if the ratio control bit from the best sector is a decrease RCB(−), the mobile station decreases the CQICH traffic-to-pilot ratio. Otherwise, if the ratio control bit from the best sector is an increase RCB(+), the mobile station increases the CQICH traffic-to-pilot ratio.

If it is determined in step 502 that the current slot does not belong to the RCB reception period, the mobile station judges that the detected control bit is a power control bit, and proceeds to step 506 to control transmission power of a reverse link according to the power control bit.

More specifically, if the power control bit means power-up, the mobile station increases a gain of a reverse pilot channel and a reverse traffic channel by a predetermined level, and correspondingly controls a gain of the channel quality indicator channel according to the CQICH traffic-to-pilot ratio. However, if the power control bit means power-down, the mobile station decreases a gain of a reverse pilot channel and a reverse traffic channel by a predetermined level, and correspondingly controls a gain of the channel quality indicator channel according to the CQICH traffic-to-pilot ratio. Here, the CQICH traffic-to-pilot ratio is controlled by a ratio control bit received from the base station at stated periods, as described in conjunction with the steps 503 to 505.

In the period where a ratio control bit is received instead of the power control bit, the mobile station changes a gain of the channel quality indicator channel according to the ratio control bit, but maintains a gain of the other reverse channels determined according to a power control bit received at a previous slot. That is, in this period, transmission power of only the channel quality indicator channel is changed.

Figure 6:
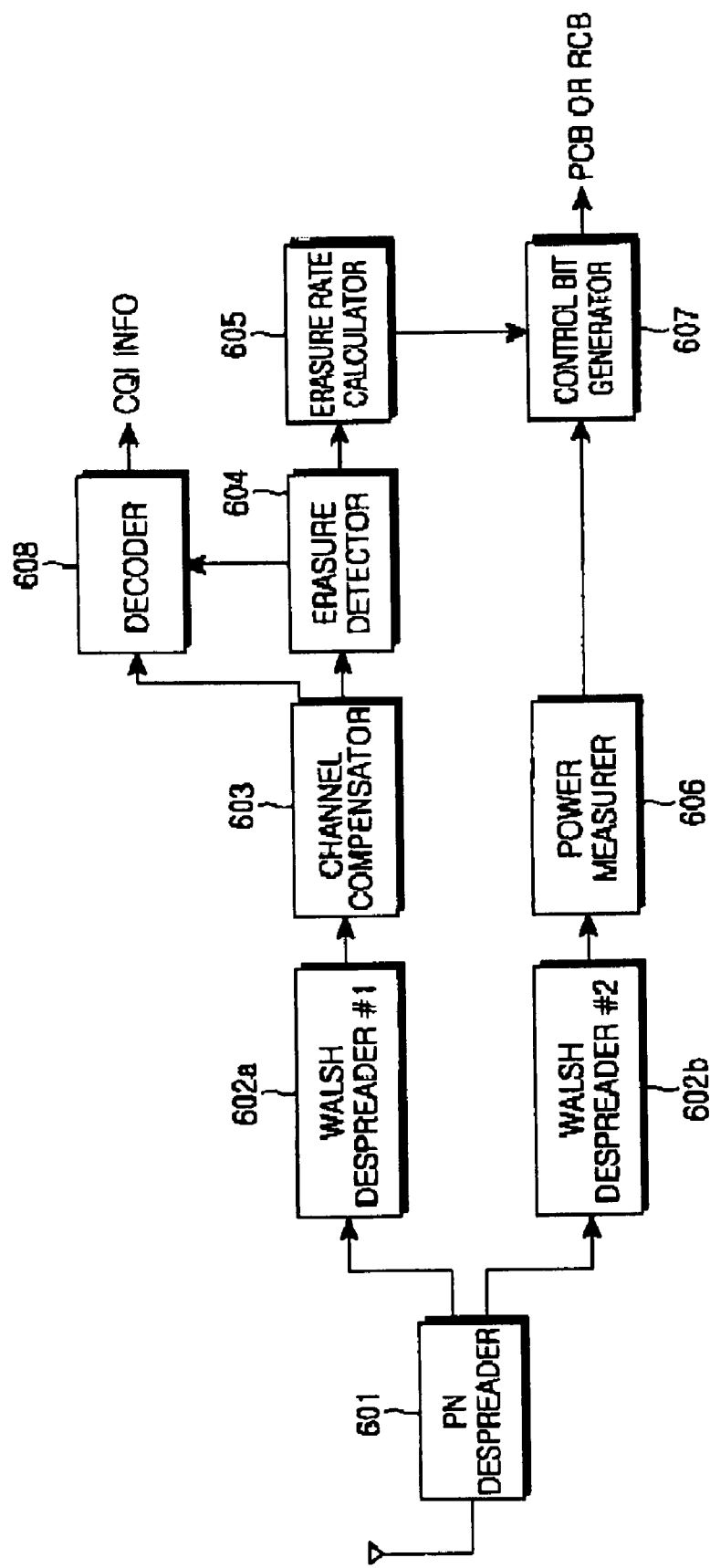
FIG. 6 illustrates a receiver structure of a base station for controlling a CQICH traffic-to-pilot ratio in a mobile communication system according to an embodiment of the present invention.

FIG. 6 illustrates a receiver structure of a base station for controlling a CQICH traffic-to-pilot ratio in a mobile communication system according to an embodiment of the present invention.

Referring to FIG. 6, a PN despreader 601 multiplies a signal received over a radio channel (such as CQICH) by a PN code assigned to the base station every time slot. A Walsh despreader 602a multiplies a signal output from the PN despreader 601 by a Walsh code assigned to a channel quality indicator channel. A channel compensator 603 compensates a power difference between a pilot channel and the channel quality indicator channel by multiplying a signal output from the Walsh despreader 602a by a conjugate signal of a channel estimation signal estimated from the pilot channel.

An erasure detector 604 measures reception power of the channel compensated signal, compares the measured reception power with a predetermined reference power, and determines whether to erase the channel quality indicator channel based on the comparison result. Determining whether to erase the channel quality indicator channel is determined according to whether reception power of the channel quality indicator channel is higher than the reference power. The erasure information from the erasure detector 604 is provided to an erasure rate calculator 605.

The erasure rate calculator 605, as described in conjunction with Equation (1), calculates an erasure rate by counting the number of erasure decisions for N slots constituting a given window and then dividing a rate of the number of erasure decisions by N. The calculated erasure rate is provided to a control bit generator 607.

A Walsh despreader 602b multiplies a signal output from the PN despreader 601 by a Walsh code assigned to a reverse pilot channel. A power measurer 606 measures reception power of a signal output from the Walsh despreader 602b, and provides its output to the control bit generator 607.

The control bit generator 607 determines, every time slot, whether a current time slot belongs to an RCB transmission period based on a system parameter previously set between the base station and the mobile station. As a result of the determination, if the current time slot belongs to the RCB transmission period, the control bit generator 607 generates a ratio control bit RCB by comparing the erasure rate provided from the erasure rate calculator 605 with a predetermined reference erasure rate. That is, the control bit generator 607 generates a ratio control bit RCB(+) indicating a command to increase a CQICH traffic-to-pilot ratio, if the erasure rate is higher than the reference erasure rate. However, if the erasure rate is lower than or equal to the reference erasure rate, the control bit generator 607 generates a ratio control bit RCB(−) indicating a command to decrease a CQICH traffic-to-pilot ratio.

However, if the current time slot does not belong to the RCB transmission period, the control bit generator 607 generates a power control bit PCB by comparing the reception power provided from the power measurer 606 with predetermined reference power. That is, if the reception power is greater than the reference power, the control bit generator 607 generates a power control bit PCB(−) indicating a command to decrease a CQICH traffic-to-pilot ratio. However, if the reception power is less than or equal to the reference power, the control bit generator 607 generates a power control bit PCB(+) indicating a command to increase a CQICH traffic-to-pilot ratio.

The control bit, including power control bit PCB or ratio control bit RCB, generated from the control bit generator 607 is transmitted to the mobile station over a forward common power control channel.

Figure 7:
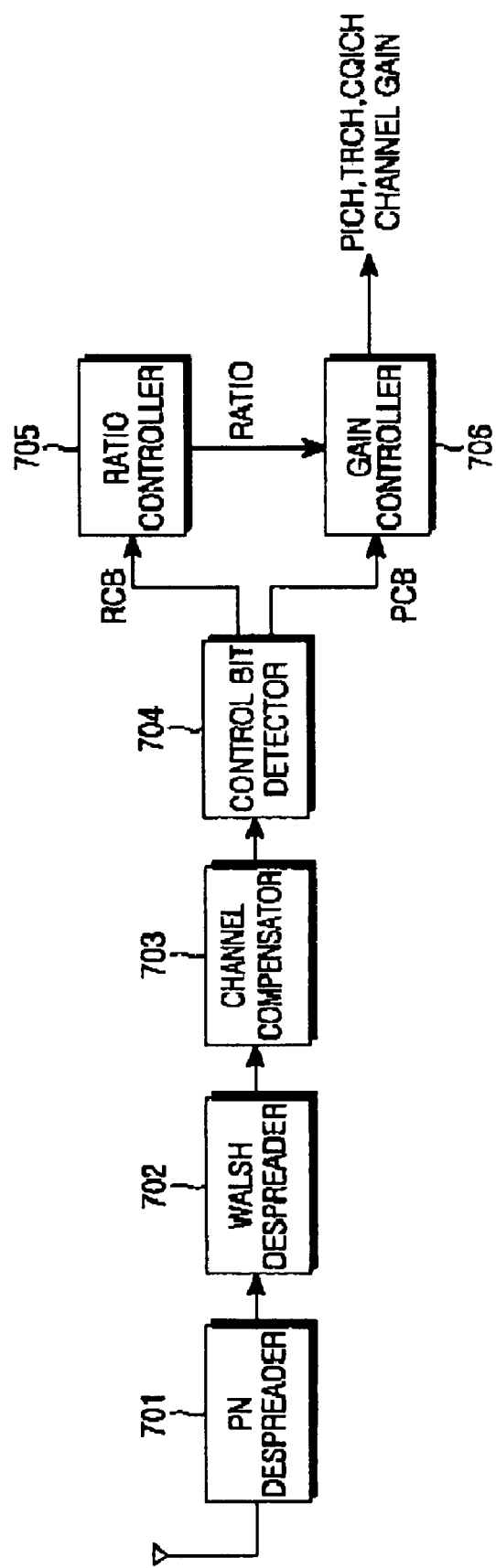
FIG. 7 illustrates a receiver structure of a mobile station for controlling transmission power of a reverse channel in a mobile communication system according to an embodiment of the present invention.

FIG. 7 illustrates a receiver structure of a mobile station for controlling transmission power of a reverse channel in a mobile communication system according to an embodiment of the present invention. Referring to FIG. 7, a PN despreader 701 multiplies a signal received over a radio channel by a PN code assigned to the mobile station every time slot. A Walsh despreader 702 multiplies a signal output from the PN despreader 701 by a Walsh code assigned to a common power control channel. A channel compensator 703 multiplies a signal output from the Walsh despreader 702 by a conjugate signal for channel compensation.

A control bit detector 704 determines whether a signal from the channel compensator 703 is a power control bit PCB or a ratio control bit RCB. That is, the control bit detector 704 can determine whether the signal from the channel compensator 703 is a power control bit PCB or a ratio control bit RCB, by checking whether the current slot belongs to an RCB reception period. As a result of the determination, if the current slot belongs to the RCB reception period, the control bit detector 704 detects a ratio control bit RCB from the output signal of the channel compensator 703, and provides the detected ratio control bit RCB to a ratio controller 705. The ratio controller 705 then determines a CQICH traffic-to-pilot ratio according to the ratio control bit RCB, and provides its output to a gain controller 706.

However, if the current slot does not belong to the RCB reception period, the control bit detector 704 detects a power control bit PCB from the output signal of the channel compensator 703, and provides the detected power control bit PCB to the gain controller 706. The gain controller 706 then determines transmission power of reverse channels according to the power control bit PCB. That is, if the power control bit indicates a command to increase transmission power (or a power-up command), the gain controller 706 increases transmission power of the reverse pilot channel and reverse traffic channel by a predetermined level. Otherwise, if the power control bit indicates a command to decrease (or a power-down command), the gain controller 706 decreases transmission power of the reverse pilot channel and reverse traffic channel by the predetermined level. Transmission power of the channel quality indicator channel is increased or decreased according to the CQICH traffic-to-pilot ratio provided from the ratio controller 705, as described above.

As stated above, by controlling a CQICH traffic-to-pilot ratio according to an erasure rate of the channel quality indicator channel, it is possible to improve channel quality of the channel quality indicator channel when only the channel quality indicator channel has a poor channel quality while the other reverse channels have a good channel quality. That is, if the channel quality indicator channel frequently undergoes the erasure process though the other reverse channels have a good channel quality, then a power control bit and a ratio control bit transmitted from the base station to the mobile station may indicate a command to decrease transmission power and a command to increase a CQICH traffic-to-pilot ratio, respectively. Although the mobile station decreases transmission power of all reverse channels based on the power control bit PCB, the mobile station decreases transmission power of the channel quality indicator channel less. This is because the CQICH traffic-to-pilot ratio is increased according to the ratio control bit. As a result, the quality of the channel quality indicator channel can be maintained.

Figure 8:
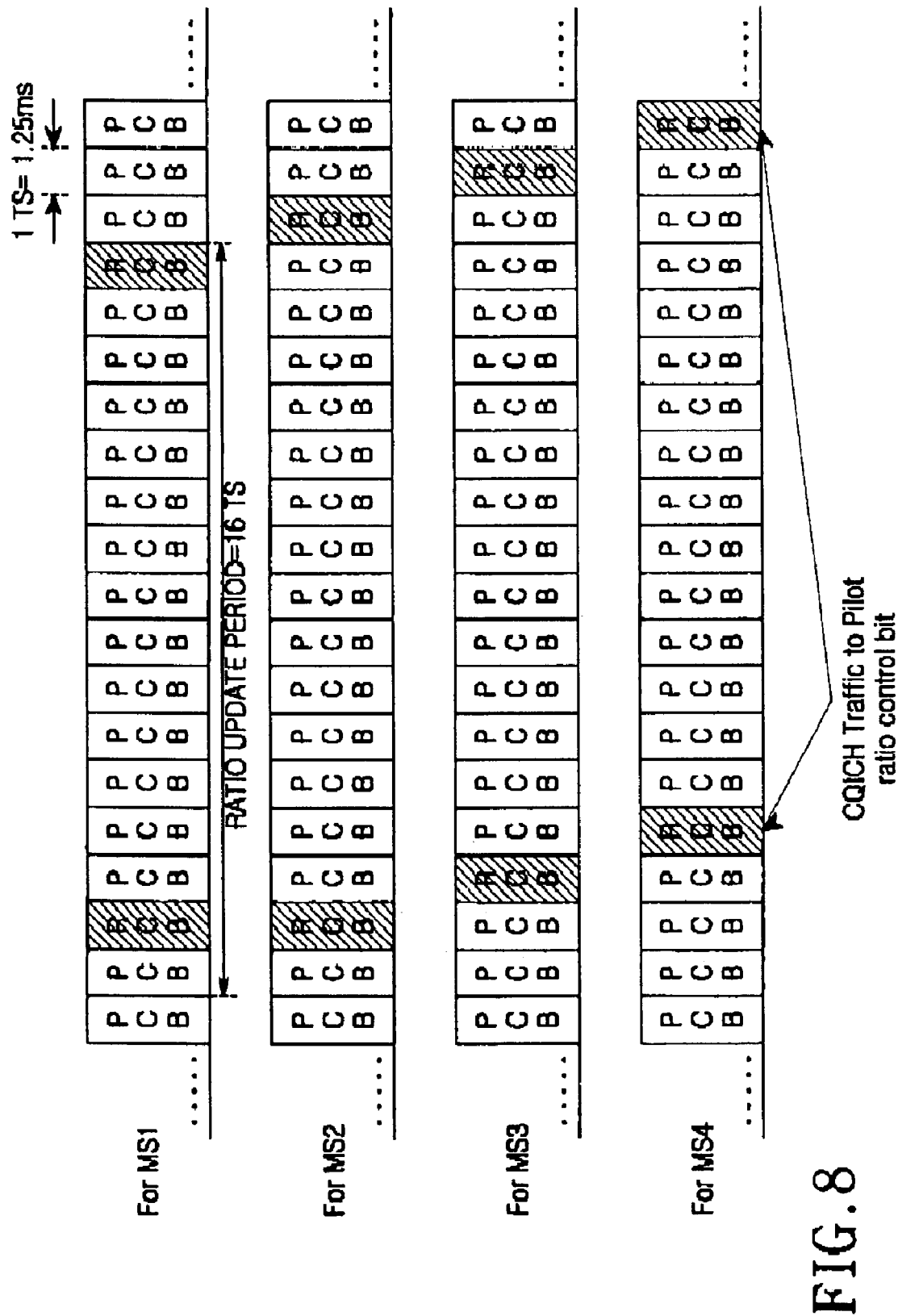
FIG. 8 illustrates a method of dispersing ratio control bits for a plurality of mobile stations by the time by one base station before transmission according to an embodiment of the present invention.

FIG. 8 illustrates a method of dispersing ratio control bits over time by one base station transmitting to a plurality of mobile stations according to an embodiment of the present invention. It is assumed in FIG. 8 that a transmission period of ratio control bits RCBs associated with mobile stations MS1, MS2, MS3 and MS4 has a transmission period of 16 slots As illustrated, the base station transmits the ratio control bits at different slots for the respective mobile stations. The reason for dispersing the ratio control bits before transmission is to maximally disperse increase/decrease in a reverse interference generated when the CQICH traffic-to-pilot ratio is changed. There are several methods of dispersing the ratio control bits before transmission.

For example, signaling can be used. That is, the base station determines how to disperse the ratio control bits and then notifies each mobile station through signaling the slot position where a corresponding ratio control bit is to be transmitted.

Alternatively, unique parameters are assigned to the mobile stations. For example, if reverse frame offsets (RFO) uniquely assigned to the mobile stations during call setup are applied to Equation (2), the base station can determine whether to transmit a ratio control bit every time slot.

$$(T-\text{Reverse\_Frame\_Offset}) \bmod (\text{Transmission\_Period}) \quad \text{Equation (2)}$$

In Equation (2), T represents a system time in a slot unit. The mobile station and the base station use the same system time, since they are synchronized. If a calculation result of Equation (2) is 0, the mobile station and the base station judge that a current time slot belongs to the RCB transmission period. In the method of using the unique parameters, the mobile station and the base station must previously exchange and/or pre-store the parameters, and determine whether to transmit a ratio control bit before controlling the CQICH traffic-to-pilot ratio.

Figure 9:
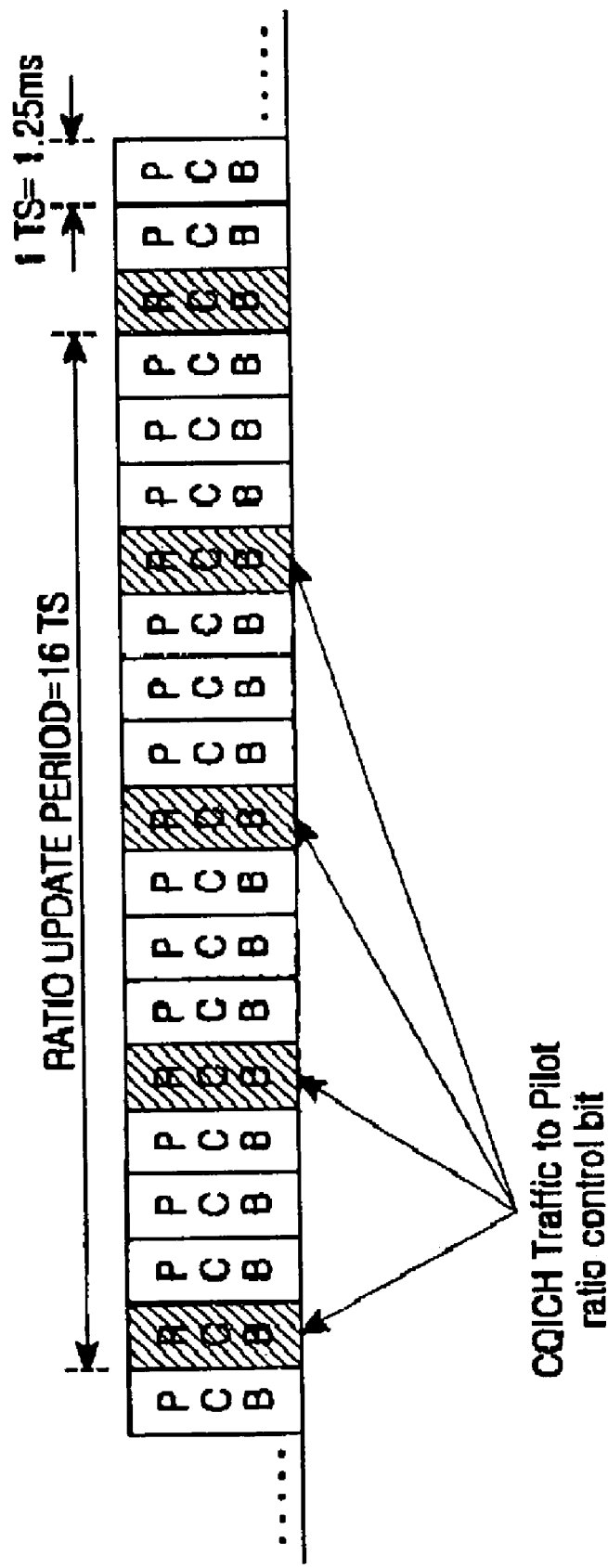
FIG. 9 illustrates a method of repeatedly transmitting the same ratio control bit to one mobile station according to an embodiment of the present invention.

FIG. 9 illustrates a method of repeatedly transmitting the same ratio control bit to one mobile station according to an embodiment of the present invention.

As illustrated, a base station repeatedly transmits four times the same ratio control bit for a 16-slot RCB transmission period. The reason for repeatedly transmitting the same ratio control bit every 4 slots is to transmit a CQICH traffic-to-pilot ratio control command within one period as accurately as possible.

To sum up, the invention enables a mobile station to maintain reception performance of the channel quality indictor channel during a soft handoff in a mobile communication system. Although the invention has been proposed to solve a problem that reception power of the channel quality indicator channel is decreased during a soft handoff, the invention can also be applied to a mobile station in a soft-handoff state in order to guarantee reception performance of the channel quality indicator channel.

As described above, the present invention provides a method for controlling a traffic-to-pilot ratio of a reverse channel quality indicator channel which is not a target of a soft handoff, in a mobile communication system. As a result, a receiver of the reverse channel quality indicator channel transmitting forward channel information can guarantee reception performance. Therefore, it is possible to improve reliability of power control on the reverse channel quality indicator channel, and the base station can receive correct forward channel quality information, thereby increasing call quality.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for performing power control on a reverse channel quality indicator channel (CQICH) received from a mobile station by a base station in a mobile communication system including the base station for transmitting a power control bit for power control on reverse channels and the mobile station for controlling transmission power of the reverse channels according to the power control bit, the apparatus comprising:

an erasure detector for determining whether to perform an erasure process by measuring reception power of the reverse channel quality indicator channel;

an erasure rate calculator for accumulating the erasure-determined result for N slots and calculating an erasure rate for the N slots; and a control bit generator for determining a ratio control bit to be transmitted to the mobile station according to the erasure rate, to issue a command to increase or decrease a CQICH traffic-to-pilot ratio according to the erasure rate.

2. The apparatus of claim 1, wherein the erasure rate is defined as a ratio of the number of erasures determined for the N slots to the number N of time slots.

3. The apparatus of claim 1, wherein the control bit generator determines a ratio control bit indicating a command to increase a CQICH traffic-to-pilot ratio if the erasure rate is higher than a predetermined reference erasure rate, and determines a ratio control bit indicating a command to decrease a CQICH traffic-to-pilot ratio if the erasure rate is lower than or equal to the reference erasure rate.

4. The apparatus of claim 3, wherein the ratio control bit is transmitted at a time slot previously determined between the base station and the mobile station over a predetermined transmission period.

5. The apparatus of claim 4, wherein the ratio control bit is transmitted instead of the power control bit in the previously determined slot of the predetermined transmission period.

6. The apparatus of claim 1, wherein the ratio control bits are dispersed in time before being transmitted so that the ratio control bits do not overlap with ratio control bits for other mobile stations in communication with the base station.

7. The apparatus of claim 6, where the ratio control bit is transmitted at a time slot satisfying the following equation, $$0 = (T - \text{Reverse Frame Offset}) \bmod INT$$

where T represents a system time in a slot unit, and INT represents a transmission period in slots.

8. The apparatus of claim 1, wherein the ratio control bit is repeatedly transmitted at least two times at time slots previously agreed between the base station and the mobile station, over a predetermined transmission period.

9. An apparatus for performing power control on reverse channels by a mobile station transmitting a reverse pilot channel, a reverse traffic channel and a reverse channel quality indicator channel (CQICH) to a base station, the apparatus comprising:
 a control bit detector for receiving a control bit from the base station, and determining whether the received control bit is a ratio control bit indicating a command to increase or decrease a CQICH traffic-to-pilot ratio or a power control bit indicating a command to increase or decrease transmission power of the reverse channels;
 a ratio controller for controlling a CQICH traffic-to-pilot ratio according to the ratio control bit, if the control bit is a ratio control bit; and
 a gain controller for receiving the ratio provided from the ratio controller, and controlling transmission gains of the reverse pilot channel, the reverse traffic channel and the reverse channel quality indicator channel according to the power control bit and the provided ratio.

10. The apparatus of claim 9, wherein the control bit detector determines whether a current time slot is a time slot previously determined between the mobile station and the base station where the ratio control bit is to be transmitted, determines the control bit as a ratio control bit if the current time slot is the previously determined time slot, and otherwise, determines the control bit as a power control bit.

11. The apparatus of claim 9, wherein the controller determines transmission power of the reverse pilot channel and the reverse traffic channel according to the power control bit, and determines transmission power of the reverse channel quality indicator channel according to the determined transmission power and the provided ratio.

12. The apparatus of claim 9, wherein the ratio control bit is received from a base station having maximum reception power among a plurality of base stations in an active set, the base stations communicating with the mobile station.

13. A method for performing power control on a reverse channel quality indicator channel (CQICH) received from a mobile station by a base station in a mobile communication system including the base station for transmitting a power control bit for power control on reverse channels and the mobile station for controlling transmission power of the reverse channels according to the power control bit, the method comprising the steps of:
 (a) determining whether to perform an erasure process by measuring reception power of the reverse channel quality indicator channel;
 (b) accumulating the erasure-determined result for N slots and calculating an erasure rate for the N slots;
 (c) determining a ratio control bit indicating a command to increase or decrease a CQICH traffic-to-pilot ratio according to the erasure rate; and
 (d) transmitting the determined ratio control bit to the mobile station.

14. The method of claim 13, wherein the erasure rate is defined as a ratio of the number of erasures determined for the N slots to the number N of slots.

15. The method of claim 13, wherein the step (c) comprises the steps of:
 determining a ratio control bit indicating a command to increase a CQICH traffic-to-pilot ratio if the erasure rate is higher than a predetermined reference erasure rate; and
 determining a ratio control bit indicating a command to decrease a CQICH traffic-to-pilot ratio if the erasure rate is lower than or equal to the reference erasure rate.

16. The method of claim 15, wherein the step (d) comprises the step of transmitting the ratio control bit at a time slot previously determined between the base station and the mobile station, over a predetermined transmission period.

17. The method of claim 16, wherein the step (d) comprises the step of transmitting the ratio control bit instead of the power control bit in the previously determined slot of the predetermined transmission period.

18. The method of claim 13, wherein the step (d) comprises the step of dispersing the ratio control bits in time before transmission so that the ratio control bits do not overlap with ratio control bits for other mobile stations in communication with the base station.

19. The method of claim 18, where the step (d) comprises the step of transmitting the ratio control bit at a time slot satisfying the following equation, $$0 = (T - \text{Reverse Frame Offset}) \bmod INT$$

where T represents a system time in a slot unit, and INT represents a transmission period in slots.

20. The method of claim 13, wherein the step (d) comprises the step of repeatedly transmitting the ratio control bit at least two times at time slots previously agreed between the base station and the mobile station, over a predetermined transmission period.

21. A method for performing power control on a reverse channel quality indicator channel by a base station receiving a reverse pilot channel, a reverse traffic channel and the reverse channel quality indictor channel from a mobile station, the method comprising the steps of:
 generating a power control bit indicating a command to increase or decrease transmission power of the reverse channels by measuring reception power of the reverse pilot channel;
 determining whether to perform an erasure process by measuring reception power of the reverse channel quality indicator channel, and calculating an erasure rate for N slots according to the reception power of the reverse channel quality indicator channel;
 determining a ratio control bit indicating a command to increase or decrease a CQICH traffic-to-pilot ratio according to the erasure rate; and
 transmitting the ratio control bit at one or more selected time slots among a plurality of time slots on a forward channel, and transmitting the power control bits at the other time slots except the selected one or more time slots.

22. The method of claim 21, wherein the ratio control bit is determined to issue a command to increase a CQICH traffic-to-pilot ratio if the erasure rate is higher than a predetermined reference erasure rate, and determined to issue a command to decrease a CQICH traffic-to-pilot ratio if the erasure rate is lower than or equal to a predetermined reference erasure rate.

23. A method for performing power control on reverse channels by a mobile station transmitting a reverse pilot channel, a reverse traffic channel and a reverse channel quality indicator channel (CQICH) to a base station, the method comprising the steps of:

(a) receiving a control bit from the base station, and determining whether the received control bit is a ratio control bit indicating a command to increase or decrease a CQICH traffic-to-pilot ratio or a power control bit indicating a command to increase or decrease transmission power of the reverse channels;

(b) if the control bit is a ratio control bit, controlling a CQICH traffic-to-pilot ratio according to the ratio control bit; and (c) controlling, if the control bit is a power control bit, transmission gains of the reverse pilot channel, the reverse traffic channel and the reverse channel quality indicator channel according to the power control bit and the ratio control bit at a previous time slot.

24. The method of claim 23, wherein the step (a) comprises the step of determining whether a current time slot is a time slot previously determined between the mobile station and the base station where the ratio control bit is to be transmitted, determining the control bit as a ratio control bit if the current time slot is the previously determined time slot, and otherwise, determining the control bit as a power control bit.

25. The method of claim 23, wherein the step (c) comprises the step of determining transmission power of the reverse pilot channel and the reverse traffic channel according to the power control bit, and determining transmission power of the reverse channel quality indicator channel according to the determined transmission power and the ratio control bit at the previous time slot.

26. The method of claim 23, wherein the ratio control bit is received from a base station having maximum reception power among a plurality of base stations in an active set, the base stations communicating with the mobile station.

27. A method for performing power control on reverse channels by a mobile station transmitting a reverse pilot channel, a reverse traffic channel and a reverse channel quality indicator channel to a base station, the method comprising the steps of:

receiving a ratio control bit indicating a command to increase or decrease a CQICH traffic-to-pilot ratio at one or more selected time slots among a plurality of time slots on a forward channel;

controlling a CQICH traffic-to-pilot ratio according to the ratio control bit;

receiving power control bits indicating a command to increase or decrease transmission power of the reverse pilot channels at the other time slots except the selected one or more time slots; and controlling transmission gains of the reverse pilot channel, the reverse traffic channel and the reverse channel quality indicator channel according to the power control bit and the ratio control bit of a previous time slot.

28. The method of claim 27, wherein the ratio control bit is received from a base station having maximum reception power among a plurality of base stations in an active set, the base stations communicating with the mobile station.

* * * * *